Sept. 3, 1968    F. G. BROCKARDT ET AL    3,399,886
ARTICLE FEEDING APPARATUS AND METHOD
Filed May 16, 1966    7 Sheets-Sheet 1

INVENTORS:
FRANK G. BROCKARDT
JOSEPH H. KOCH
BY
THEIR ATTORNEYS

INVENTORS:
FRANK G. BROCKARDT
JOSEPH H. KOCH
BY
THEIR ATTORNEYS

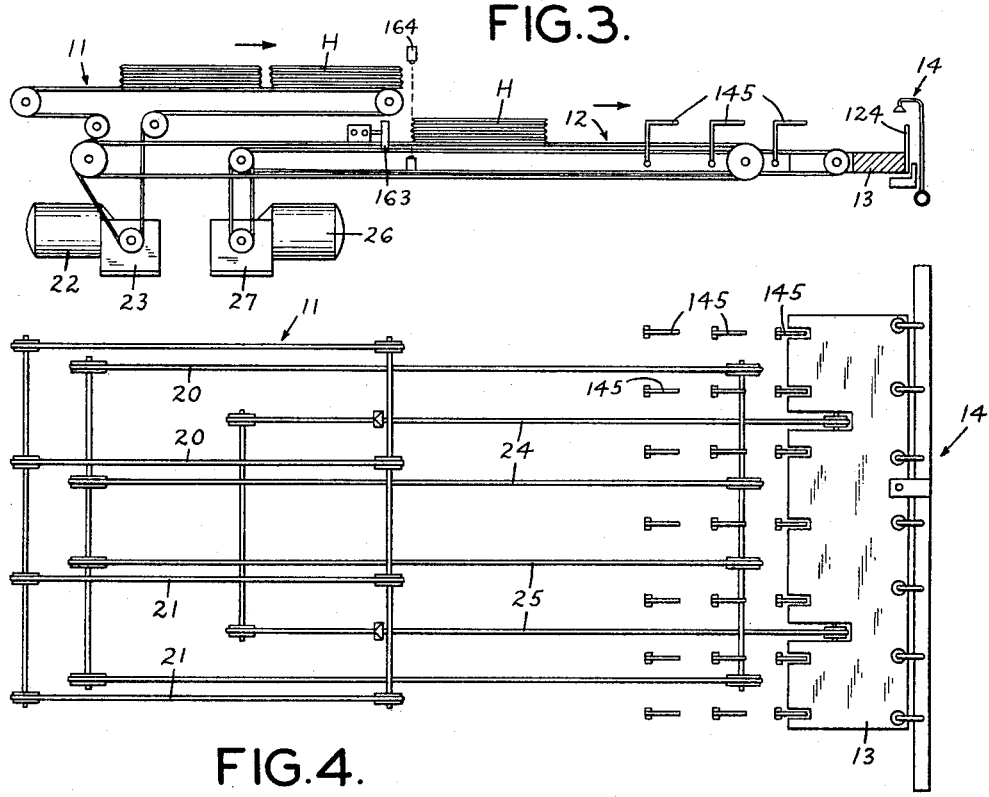
FIG.3.
FIG.4.
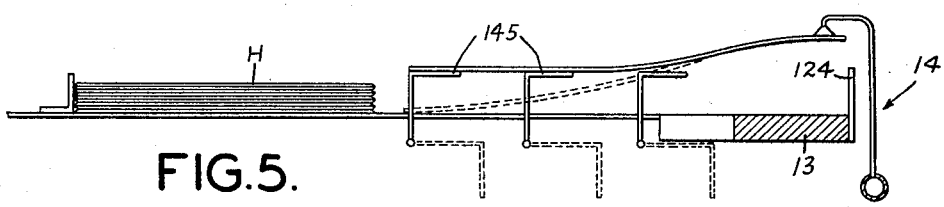
FIG.5.
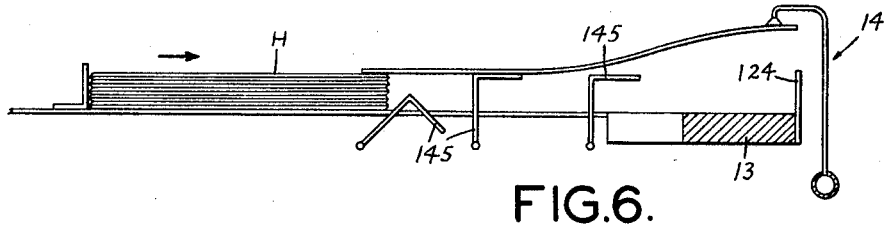
FIG.6.
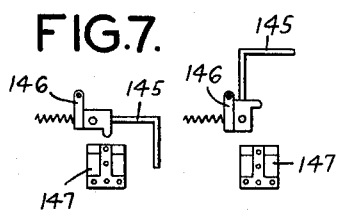
FIG.7.
INVENTORS:
FRANK G. BROCKARDT
JOSEPH H. KOCH
BY
*Burmbaugh, Free, Graves & Donohue*
THEIR ATTORNEYS

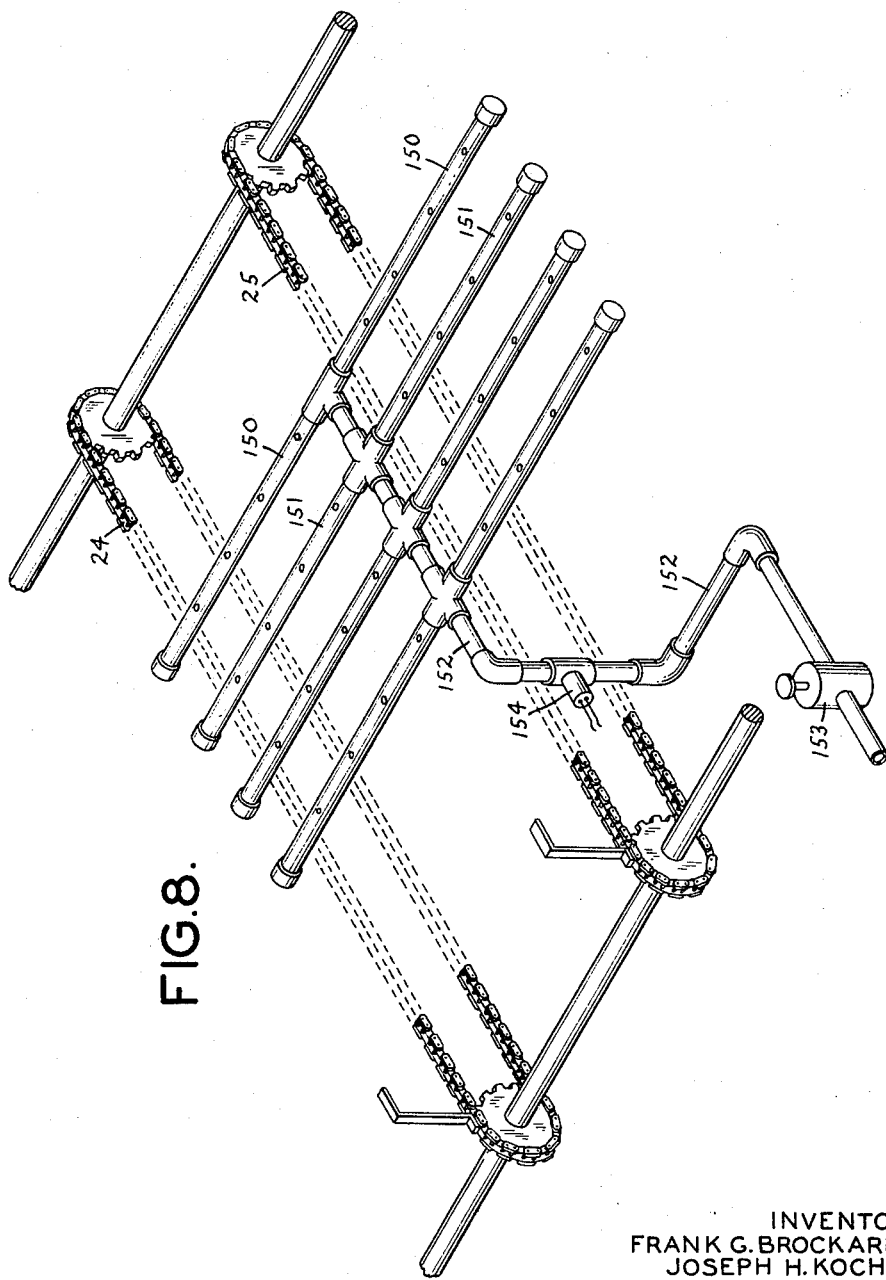

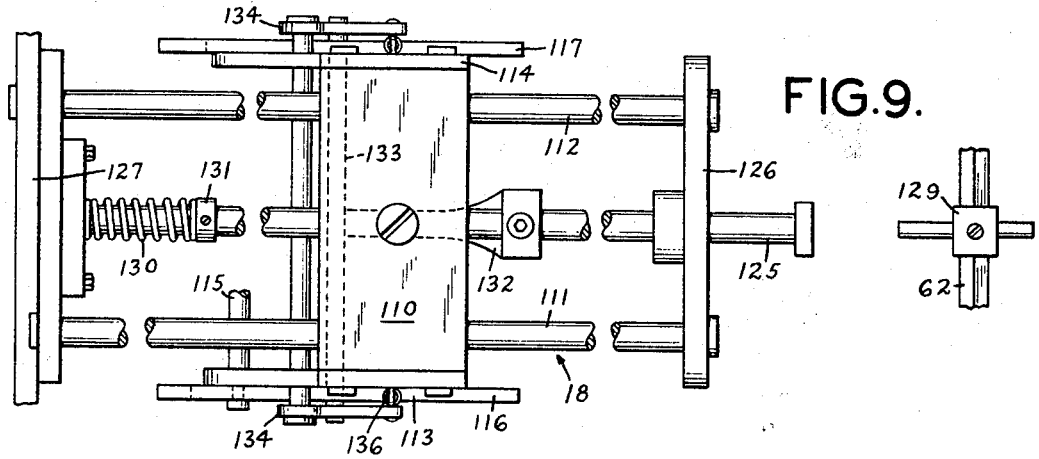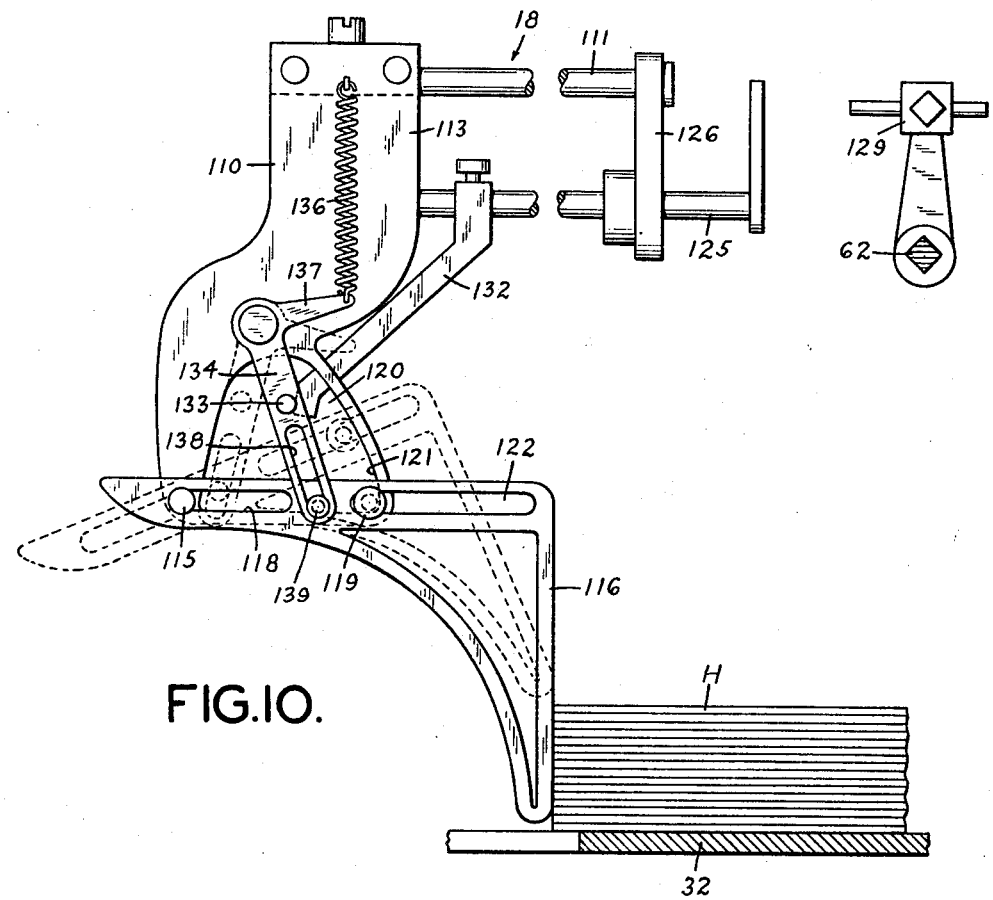

Sept. 3, 1968    F. G. BROCKARDT ET AL    3,399,886
ARTICLE FEEDING APPARATUS AND METHOD
Filed May 16, 1966    7 Sheets-Sheet 7

INVENTORS:
FRANK G. BROCKARDT
JOSEPH H. KOCH
BY
*Brumbaugh, Free, Graves & Donohue*
THEIR ATTORNEYS United States Patent Office 3,399,886
Patented Sept. 3, 1968

3,399,886
ARTICLE FEEDING APPARATUS AND METHOD
Frank G. Brockardt and Joseph H. Koch, Wheeling, W. Va., assignors to West Virginia Pulp and Paper Company, New York, N.Y., a corporation of Delaware
Filed May 16, 1966, Ser. No. 550,289
20 Claims. (Cl. 271—14)

ABSTRACT OF THE DISCLOSURE

An apparatus for feeding articles, such as gusseted paper bags, including a mechanism for supplying stacks of bags to a pick-up station and including a vacuum pick-up for lifting the topmost article from the stack and delivering it to gripping elements which grip and support the bag and move it out of the path of movement of the vacuum pick-up so that the pick-up can move below the bag supported by the gripping means and engage the topmost bag on the stack. Thereafter the gripping means is moved in a path above the pick-up to insert the bag held by the gripping means between conveyors for discharging the bag from the apparatus. After discharge of the bag, the pick-up lifts the bag it has engaged for engagement by the gripping means. At the pick-up station, the leading edges of the articles, particularly gusseted bags, are supported in curved form and are engaged by the vacuum pick-up devices which are also arranged in a complementary curve to maintain the articles or bags bent and prevent the gussets in the bags from unfolding prior to engagement by the gripping means.

---

This invention relates to apparatus and methods for handling and feeding articles and more particularly, to methods and apparatus for feeding single bags from piles or stacks containing a plurality of such bags, commonly called hands, to other apparatus for further treatment, processing or use thereof.

It is common in industries to remove articles from a pile or stack and feed them to other apparatus, such as, for example, feeding bags to a sewing machine for sewing an open end of the bag. Inasmuch as manual feeding of bags is slow with resulting low production rates, efforts have been made to provide automatic feeding apparatus to enable a more continuous production of the finished article. Apparatus provided heretofore has, however, been confronted with obstacles to their proper operation which makes it impractical to handle certain types of bags such as bags having side gussets and feed the bags at adequate rates. Partially completed bags having gussets in their sides can be picked off a stack and fed to a conveying system or the like only with great difficulty for the reason that the pick-up apparatus usually engages only one side of the bag and, upon lifting, the gusset opens thus preventing smooth transfer to the conveying system, frequently causing bags to be crumpled and jamming the conveyor system. Moreover, in the prior apparatus, the bag must be lifted and then completely removed from the feeding apparatus before another bag can be picked from the stack with the result that the feed rate is too slow for efficient production. Also in the prior apparatus, it has been difficult to supply hands of bags to a station where they can be picked-up one by one and to maintain a neat stack of bags which will not slide relatively and cause malfunctioning of the apparatus.

In accordance with the present invention, article handling and feeding apparatus and methods are provided which overcome the deficiencies of the prior apparatus and are capable of feeding bags at high speeds on the order of 60 to 100 bags a minute in synchronism with other processing apparatus.

More particularly, in accordance with the present invention, hands of bags are fed successively to a station where the bags are picked-up successively by vacuum pick-up means and transferred to gripping elements which are operated in timed relation to feed the bags one after the other into a conveying system for transporting the bags to a sewing machine or other processing apparatus. In order to obtain a high feed rate, the vacuum pick-up means and the gripping means are arranged to move in intersecting paths and in such timed relation that the pick-up means can move in a direction to pick up another bag before the gripping means has transferred a bag to the conveying system. In this way, the feeding rate of the apparatus can be almost doubled as compared to prior feeding apparatus with consequent improvement and economy in production.

In supplying the hands of the bags or other articles to the forming station, means are provided whereby the last remaining bag in the hand at the pick-up station can be raised to enable another hand to be introduced beneath it and maintained in an even stack without sliding, or "shingling" so that each bag is presented accurately for removal from the stack by the pick-up means. In this way, malfunctioning of the apparatus is avoided and increased feed rates can be obtained under the control of the sewing machine or the other processing apparatus so that the desired number of bags in the proper order and spaced relation can be supplied to the sewing machines or other processing apparatus.

For a better understanding of the present invention, reference may be had to the accompanying drawings in which:

FIGURE 3 is a schematic side elevational view of the apparatus illustrating the conveyor system for feeding the hands of bags to the pick-up and removal apparatus;

FIGURE 4 is a schematic plan view thereof;

FIGURE 5 is a schematic side elevational view illustrating the operation of the apparatus for lifting the last bag of a hand to enable another hand of bags to be introduced therebeneath;

FIGURE 6 is a schematic side elevational view illustrating another position of the hand of bags being introduced beneath the last bag of the preceding hand;

FIGURE 7 is a schematic illustration of apparatus for raising the last bag of a hand;

FIGURE 8 is a perspective view of a modified system for raising the last bag of a hand to enable introduction of another hand of bags therebeneath;

FIGURE 9 is a plan view of a packer for maintaining the bags in a hand in a stacked relation;

FIGURE 10 is a side elevational view thereof;

The invention will be described with reference to an apparatus for feeding partially completed gusseted bags having open opposite ends to a sewing machine for sewing one end of the bag, the bag feeding apparatus being under the control of the sewing machine so that bags are fed in proper order while the sewing machine is in operation and feeding of the bags is discontinued when the sewing machine is stopped.

It will be understood that the apparatus is not limited to the use indicated above.

Figure 1:
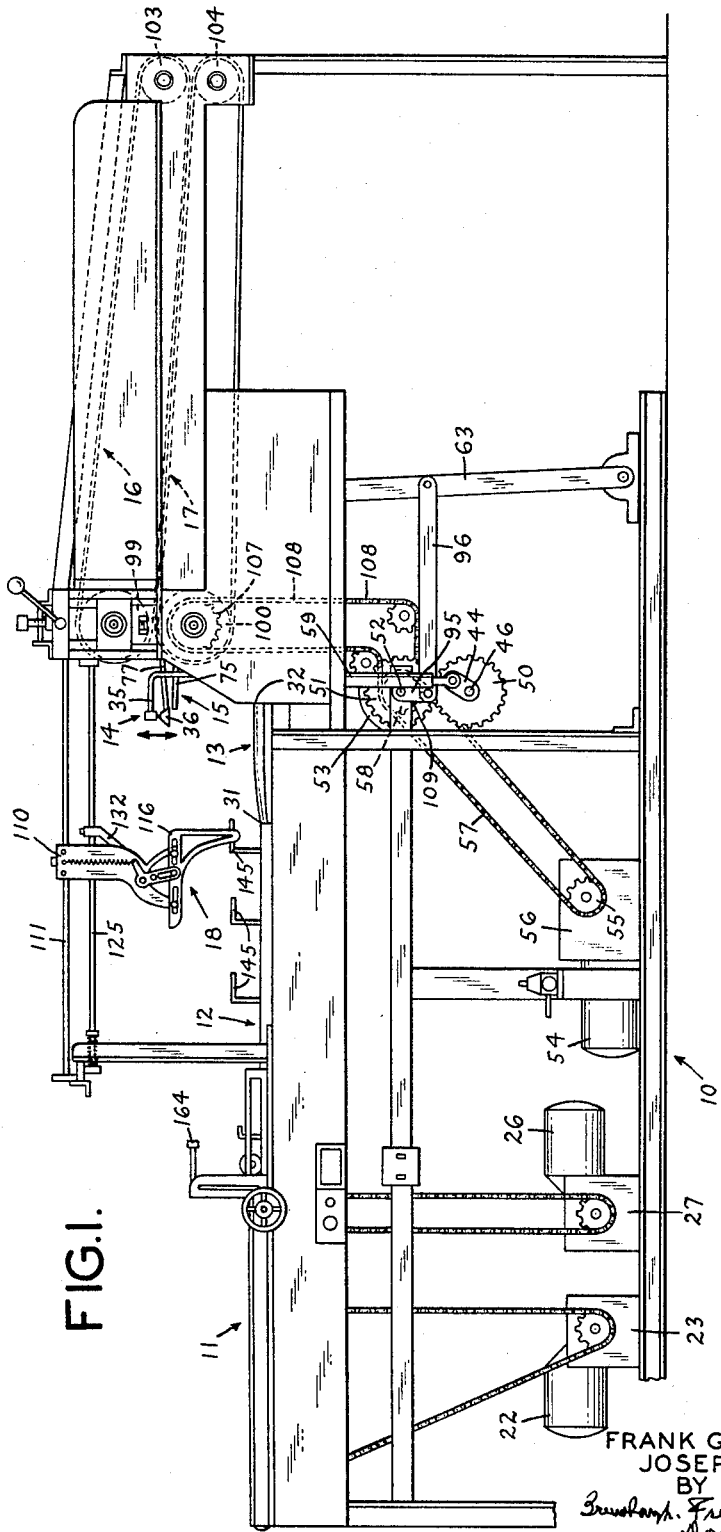
FIGURE 1 is a side elevational view of a typical apparatus embodying the present invention for supplying gusseted bags to a sewing machine.

Referring now to FIGURE 1 of the drawings, a typical apparatus embodying the present invention includes a frame 10 for supporting the various elements of the apparatus. At the left-hand end of the apparatus as viewed in FIGURE 1 is a conveyor 11 on which are deposited by a bag counter or in any other way successive hands H of open ended gusset bags to be transferred intermittently and in succession to a second conveyor 12 for movement intermittently and in succession to a pick-up station and former 13. Adjacent the right-hand end of the former 13 is a vacuum pick-up device 14 by means of which the uppermost bag of hand on the former 13 is raised from the hand to enable its leading edge to be gripped by means of grippers 15 and transferred between the continually running conveyors 16 and 17 for transport to a sewing machine or other apparatus. Also mounted on the frame 10 is a bag packer 18 by means of which the edges of the bags are kept even and sliding movement of the bags in a stack is prevented while they are on the former 13. In operation, the vacuum pick-up device 14 is moved up and down to pick up a bag and lift it so that its leading edge can be engaged by the grippers 15 which then move the bag to the left out of the path of movement of the pick-up device 14 so that the pick-up device can move downwardly and engage and lift another bag. During downward movement of the pick-up device, the grippers 15 move to the right and insert the leading edge of the bag between the belts 16 and 17 so that the belts can carry the bags away.

Figure 2:
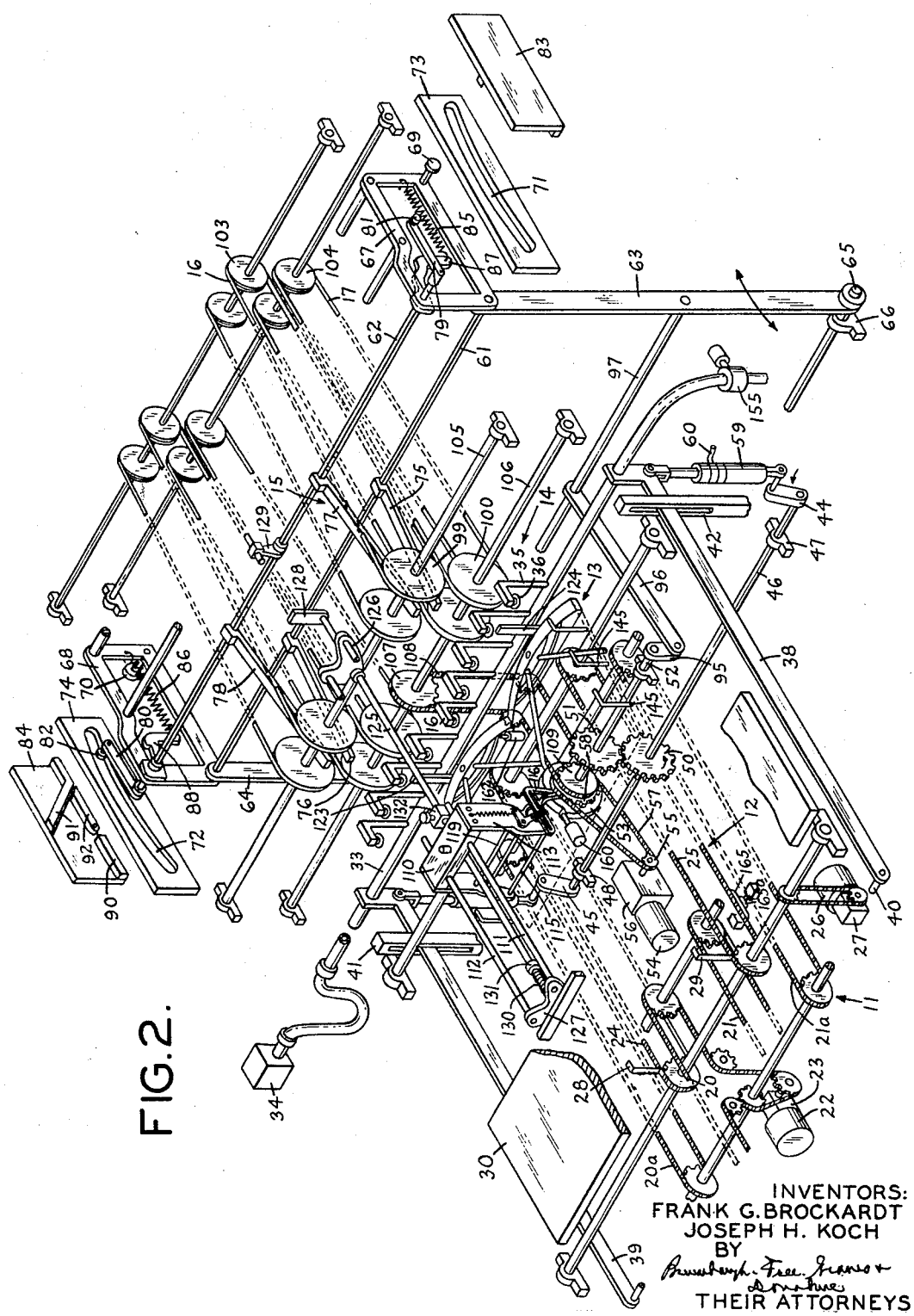
FIGURE 2 is a schematic perspective view of the apparatus with the frame removed to disclose details of construction of the apparatus.

Referring now to FIGURES 1, 2, and 3 of the drawings, the conveyor 11 may consist of a plurality of feeding chains 20 and 21, and carrier chains 20a and 21a which are driven by means of an electric motor 22 and reduction gear 23 so that their upper flights move to the right. The motor is adapted to be energized and de-energized intermittently in response to a signal described hereinafter. As illustrated schematically in FIGURE 3, the conveyor 11 advances a hand H of bags and drops them on the conveyor 12 which may likewise include a plurality of chains 24 and 25 which are driven by means of a reversible motor 26 and a reduction gear 27. Extending upwardly from the chains 24 and 25 are pusher arms 28 and 29 by means of which a hand of bags is advanced along a supporting table or platform 30 to the former and pick-up station 13. As illustrated in dotted lines in FIGURE 2, the former 13 is a platform having a substantially straight leading edge 31 and a rear edge portion 32 which has an upwardly single or double, triple, or multiple convex curvature, as illustrated, a double curvature in a vertical plane. The hand of bags accordingly, tends to conform to the shaped curved end portion 32 of the former 13 and by bending prevents separation or opening of the gussets at the leading edges of the bags.

As best shown in FIGURE 2, the vacuum pick-up device 14 includes a hollow manifold 33 which is connected at its end to a vacuum pump 34 by means of a coupling such as a flexible hose or the like. Extending upwardly from the manifold, are a series of conduits 35 of generally inverted L-shaped configuration and having downwardly facing suction cups 36 on their outer ends so that the suction cups engage and by means of the reduced pressure therein become attached to the uppermost bag of the hand. The manifold 33 is supported at its opposite ends by means of a pair of lever arms 38 and 39 which are pivotally supported at their left hand ends on a shaft 40 or stub shafts engaging the frame 10 to enable up and down oscillating movement of the arms 38 and 39 and the manifold 33 supported thereon. Suitable guide means 41 and 42 may be mounted on frame 10 to guide the arms 38 and 39 in their up and down movements.

The suction cups on the various conduits 35 are arranged in double arcs substantially complemental to the double convex curvature of the end portion 32 of the former 13 so that as the manifold moves down and the suction cups engage the uppermost bag of the hand on the former 13, the hand is bent into a double convex curvature which, as mentioned above, prevents opening of the gusset in the leading edge of the bag. Up and down movement of the arms 38 and 39 is produced by means of cranks 44 and 45 at opposite ends of a shaft 46 which is mounted in bearings 47 and 48 on the frame 10 (FIGURES 1 and 2). A gear 50 on the shaft 46 meshes with a gear 51 on the transverse main shaft 52 which is driven by means of a single revolution clutch 53. A motor 54 drives a sprocket 55 on a reduction gear 56, the sprocket 55 being connected by means of a chain 57 to a sprocket 58 which is connected to a clutch 53 so that upon actuation of the clutch in response to a signal, the shafts 52 and 46 are driven through one complete revolution and stop.

The up and down movement of the manifold 33 as the number of bags in a hand decreases as a hand is supplied to the former is controlled by means of pneumatic cylinders 59 interposed between the cranks 44 and 45 and the arms 38 and 39. The pneumatic cylinders are maintained at a constant pressure by air introduced by means of a conduit 60. The air pressure normally forces the arms 38 and 39 toward their respective cranks 44 and 45 and the air cylinders act as variable links to compensate for the difference in travel necessary for the suction cups to engage bag on the former 13, whether it is the top bag of a hand or the bottom bag of a hand. From the preceding description, it will be apparent that the manifold 33 and the suction cups 36 can move down to engage the uppermost bag of the hand and upon backward movement will lift the uppermost bag while retaining it in curved condition so that the gusset at the leading edge of the bag cannot open even though the underside of the bag is unsupported.

The gripping means 15 detaches and removes the bag from the suction cups 36. Referring to FIGURES 2 and 12–14, the gripping means 15 includes a pair of transverse shafts 61 and 62, the lowermost shaft 61 being mounted in the upper ends of lever arms 63 and 64 which are pivotally supported at their lower ends on a shaft 65 rotatably mounted in bearings 66 on the frame 10 so that the upper ends of the lever arms oscillate substantially horizontally. Fixed to the opposite ends of the shaft 61 are generally rectangular frames 67 and 68 provided with rollers 69 and 70 at their lower rear ends which move along arcuate cam tracks 71 and 72 in cam members 73 and 74 which are fixed to the frame 10 and serve to guide the frame members during oscillating movements of the lever arms 63 and 64 to establish a gripper path between suction cups 36 and the nip of conveyors 16 and 17. Fixed to the shaft 61 are rearwardly extending gripping arms 75 and 76 which as shown in FIGURE 2 extend between pairs of manifold conduits 35 on the manifold 33 and can be advanced to the left as viewed in FIGURE 2 beyond the suction cups 36 and below a bag lifted by the suction cups to their upper limit of movement.

Figure 13:
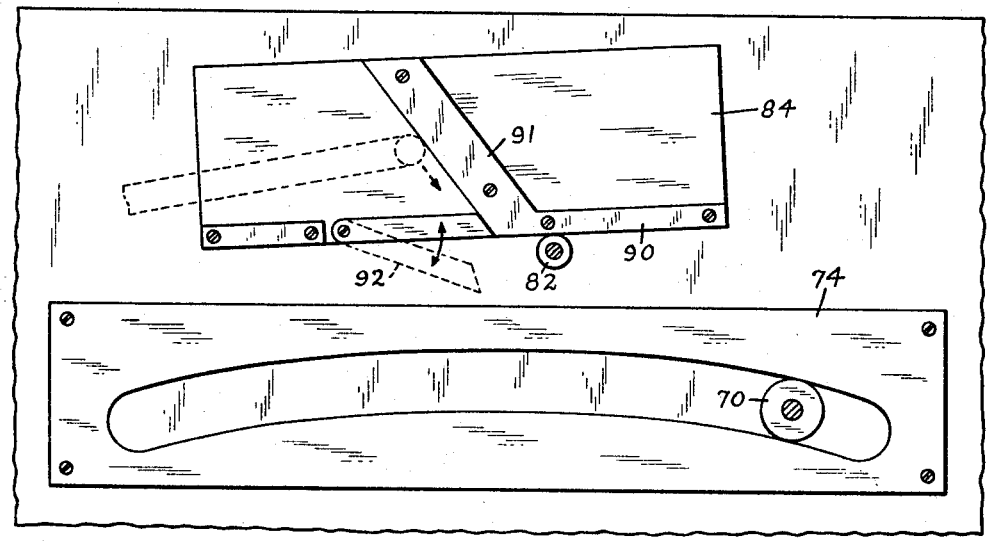
FIGURE 13 is a view in section taken on line 13—13 thereof.
Figure 14:
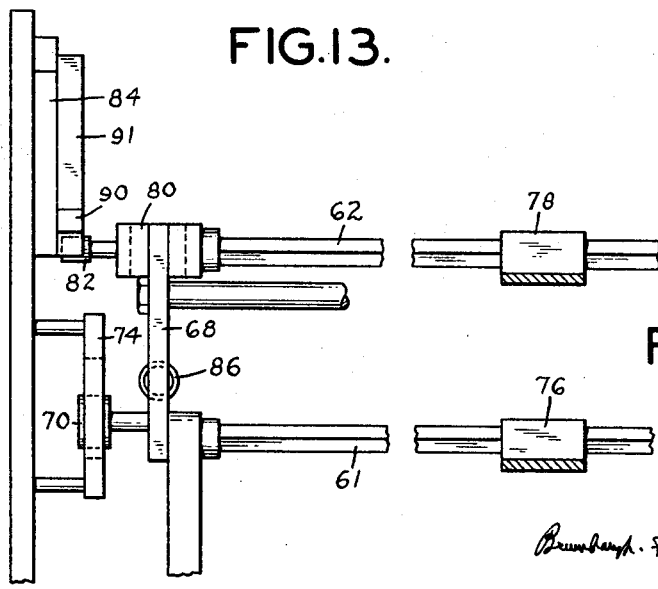
FIGURE 14 is a fragmentary elevational view of the gripping mechanism of the apparatus.

Cooperating gripper arms 77 and 78 are fixed to the shaft 62 which is rotatably mounted in the upper left hand corners of the frames 67 and 68. Crank arms 79 and 80 having cam follower rollers 81 and 82 on their trailing ends are fixed to the opposite ends of the shaft outwardly of the frames 67 and 68. As shown in FIGURES 2 and 13, the cam follower rollers cooperate with cam plates 83 and 84 which are supported on the frame 10 in fixed relation to the cam members 73 and 74. Springs 85 and 86, each having one end attached to each frame 67 and 68 and their opposite ends attached to levers 87 and 88 fixed to the shaft 62, normally bias the grippers 77 and 78 into engagement with the grippers 75 and 76 and also bias the lever arms 79 and 80 upwardly. The rollers 81 and 82, for example, the roll 82 as shown in FIGURE 13, engages beneath a cam rail 90 extending along the length of the cam 84 as the grippers move to the left and engage an inclined cam rail 91 on movement of the gripper members to the right. A hinged gate section 92 in the cam rail 90 is normally biased against the cam rail 91 by means of a spring 93 but allows the cam roller 82 to pass down the cam rail 91 and beneath the cam rail 90 during the movement of the grippers and lever arms 63 and 64 to the right. The follower rolls 81 and 82 run off the left hand end of the cam rail 90 and the grippers 77 and 78 rock to engage and strip the bag from the suction cup 36 when the ends of the grippers 75 and 78 are disposed on opposite sides of a bag supported by the vacuum cups 36. As the follower rolls 82 and 83 engage and move down the inclined surfaces of the cam rail 91 the grippers 77 and 78 are rocked to release the bag.

In order to time the generally horizontal movement of the grippers with respect to the generally vertical movements of the manifold 33, cranks 95 (FIGURE 2) are mounted on each end of the main drive shaft 52, the cranks being connected by means of links 96 to a cross shaft 97 fixed at its ends to the lever arms 63 and 64. By properly adjusting the angular relations of the cranks 44 and 45 for moving the manifold 33 up and down and the cranks 95 for moving the grippers forwardly and backwardly, a bag is lifted off of a hand and raised by the pick-up device, the gripping members 75 and 77, 76 and 78 grip the leading edge of the bag and move it backwardly to the left as viewed in FIGURES 1 and 2 out of the path of the suction cups. The manifold 33 then moves downwardly and the grippers move to the right passing the bag over the suction cups 36 and supporting conduits 35 and deliver it to the transfer conveyors 16 and 17.

As the grippers 75 and 77 and 76 and 78 carry the bag to the right, the edges of the bag are gripped between a plurality of pairs of pinch rolls 99 and 100 and are carried away between continuously moving transfer conveyors 16 and 17 which extend around the pinch rolls and around other pulleys 103 and 104 at the discharge end of the apparatus. The pairs of pinch rolls 99 and 100 are carried on shafts 105 and 106, the latter having a sprocket 107 which is driven by means of a chain 108 and a sprocket 109 which is fixed to and rotates with the sprocket 58 so that the belt conveyors 16 and 17 are constantly driven.

Referring to FIGURE 2, it will be seen that the gripping members 75 and 76 are disposed below the nip between the pinch rolls 99 and 100 while the gripper members 77 and 78 move up and down above the nip. Inasmuch as the grippers are spaced apart at their rear ends, when their forward ends are opened by engagement of the follower rolls 81 and 82 with the inclined cam rail 91 during movement of the grippers toward the conveyors 16 and 17, the bag is drawn between the jaws and carried away by the conveyors to the sewing machine or other apparatus.

Figure 11:
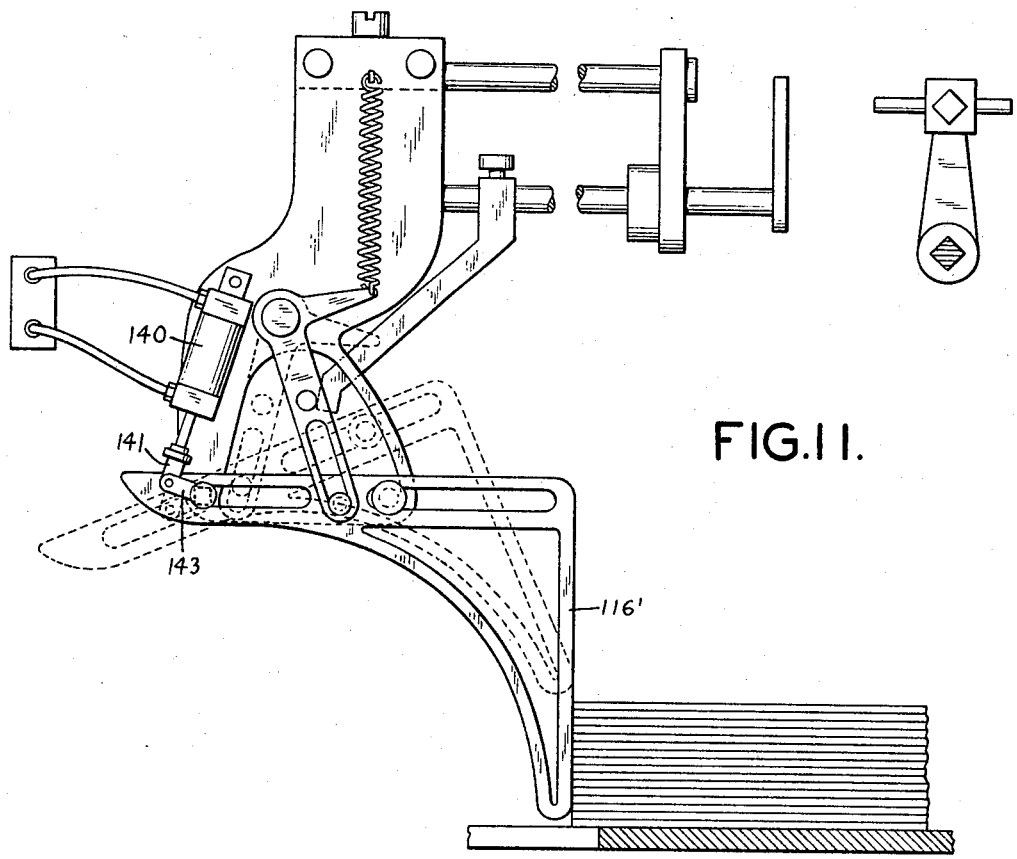
FIGURE 11 is a side elevational view of a modified form of bag packer embodying the invention.

Other mechanisms are provided to facilitate proper feeding of the bags and maintain them in stacked relation on the former. Thus, as shown in FIGURES 1, 2, 9 and 10, the packer 18 is included to keep the edges of the bags in alignment. The packer includes a generally inverted U-shaped frame 110 which is adjustably mounted on a pair of bars or rods 111 and 112 mounted on the frame 10 above the conveyor chains 24 and 25. At the lower ends of the arms 113 and 114 of the frame 10, is mounted a transverse shaft 115 which pivotally and slidably supports generally L-shaped packer members 116 and 117. To enable pivoting and sliding movements of the packer members 116 and 117, each of them is provided with a longitudinally extending slot 118 receiving the end of the shaft 115. A cross shaft 119 connects the packer members 116 and 117 and extends through an opening 120 in each of the arms 113 and 114. An arcuate edge 121 of the opening 120 is substantially concentric with the pivot shaft 115 whereby the packer members 116 can pivot to the dotted line position shown in FIGURE 10. The shaft 119 has its opposite ends received in elongated slots 122 in the packer members 116 and 117. In this way, the packer members 116 and 117 can move horizontally as well as pivot relative to the arms 113 and 114. With a hand H of bags on the former and with their leading edges engaging the forward stops 123 and 124 at the rear end 32 of the former, the packer members are reciprocated to engage the trailing edges of the bags and bring them into or maintain them in alignment. For reciprocating the packers 116, a push rod 123 is slidably mounted in the mounting brackets 126 and 127 supporting the guide rods 111 and 112 on the frame 10 and a striker plate 128 is fixed to the right hand end of the shaft or rod 125 as viewed in FIGURES 2 and 9 and 10. A striker member 129 mounted on the shaft 62 strikes the plate 128 as the gripper members move toward the hand of bags or the former 32 and pushes the shaft 125 to the left compressing a spring 130 which engages a collar 131 on the shaft. Extending downwardly from the shaft 125 is an arm 132 which engages a cross shaft 133 carried by a pair of levers 134 and 135 pivotally mounted at their upper ends of the arms 113 and 114 of the frame 110. A tension spring 136 is connected with another arm 137 on each of the levers 134 and normally biases the levers in a counterclockwise direction. An elongated slot 138 in each arm 134 slidably and pivotally engages a pivot pin 139 on each of the packer members 116 and 117. In this way, the packer members are reciprocated horizontally by the striker 129 and the spring 136 against the edges of the bags in the hand H and align them. As shown in dotted lines in FIGURE 10, the packer members 116 and 117 tilt to enable a hand of bags to be moved beneath them by means of the feeding chains 24 and 25 and the pushers 28 and 29 thereon. While no difficulty usually is encountered with rumpling or displacing the bags by dragging the packer members on them, it may be desirable, as shown in FIGURE 11, to provide auxiliary means for lifting the packers. To that end, the arm 113 and/or both of the arms may be provided with air cylinders 140 pivotally connected thereto and having a piston rod 141 thereof connected to an arm 143 slideably and non-rotatably connected to the packer member 116' so that upon admitting air under pressure to the cylinder 140, the packer members 116 are lifted out of the path of the hand of bags. The frame 110 and the arm 132 are adjustable along their respective supporting rods to accommodate bags of different sizes.

In addition to packer members for maintaining bag alignment, means are provided for lifting the last bag on the former 13 to permit another hand to be introduced onto the former below the last bag. As shown in FIGURES 1 to 7, one form of lifting means may consist of a series of generally inverted L-shaped lifting arms 145 which are disposed in front of the former 13 and pivotally supported at their lower ends on the frame 10. Each of the arms has flat surfaces engaged by a spring biased lever 146 which retains the arm 145 either in an erected position or a lowered position. A momentarily energized solenoid 147 associated with each of the arms forces the arm to erected position to lift the trailing edges of the bag B. However, an advancing hand of bags can force the arms 145 downwardly out of the path of the bags where they are retained by means of the levers 146.

A modified system for lifting the last bag of the hand is shown in FIGURE 8. In this system, a series of perforated pipes 150, 151 and so forth are supplied with air by means of a conduit 152 from a suitable air source and under the control of a pressure regulating valve 153 and a solenoid valve 154. The flow of air through the perforations in the pipes 150 and 151 is adjusted by means of the regulating valve 153 to enable the air jetted by the perforations to raise the trailing edge of the last remaining bag on the former but insufficient to lift more than one bag. The solenoid valve 154 is actuated to jet air against the remaining bag on the former while the conveyor 12 is being driven to push a hand of bags onto the former 13.

While the vacuum pick-up suction cups do not prevent the release of the bags by means of grippers, their action can be minimized at the time the bag is seized by the grippers by introducing air under pressure into the manifold 33 at the time the grippers engage the bag through a solenoid valve 155 connected to the manifold 33 as shown in FIGURE 1. Thus, a puff of air at approximately forty pounds per square inch pressure into the manifold 33 will break the suction of the suction cups 36 and release the bag.

The operating controls for the apparatus are as follows.

As shown in FIGURE 2, the single revolution clutch 53 which is of conventional and known type is controlled by a solenoid actuated pawl 160 moved in response to a signal received from the sewing machine or other apparatus, the pawl being withdrawn momentarily to allow the motor 54 to rotate the shaft 52 and the shaft 46 a single revolution in a direction to move the manifold 33 and suction cups downwardly and upwardly and move the grippers 75 and 78 rearwardly to grip the bag carried upwardly by the suction cups 36, move it further rearwardly to clear the suction cups and then forwardly to discharge the bag. After a number of cycles, all of the bags except one have been removed from the former. A plunger 161 adjustable to compensate for bags of different thicknesess is mounted on the manifold 33 and actuates a micro switch 162 which sets the electric motor 26 into operation thereby advancing the pusher feeding conveyor 12 to discharge a hand of bags onto the former 13. The micro switch 162 also actuates the valve 153 or the solenoid 147 to lift the last remaining bag. When the hand is deposited on the former, the motor 26 stops momentarily until the topmost bag is discharged from the newly fed hand and then reverses its direction to carry the pushers 28 and 29 back in a position to receive another hand of bags.

When the signal for the single revolution clutch pawl 160 is sent for the next bag to be fed, it actuates a relay to reverse the motor 26 and return the pushers 28 and 29 to their starting point adjacent the conveyor 11.

The conveyor 11 is driven by energizing the motor 22 by means of a micro switch when the pushers 28 and 29 are returned to the left (FIG. 1) and the movement of the conveyor 11 is stopped by means of an electric eye 164 which detects the trailing edge of a hand being discharged onto the conveyor 12. The conveyor 11, accordingly, runs until a hand of bags has been discharged onto the conveyor 12 even though the spacing of the bags on the conveyor 11 may vary a great amount. If desired, an electric interlock may be provided between the electric eye and the switch 162 to prevent the conveyor 12 from being driven until a hand of bags has completely cleared the electric eye.

One of the pusher chains 27 or 28 has two bar cams 165, 165a on it that precede the pushers of their return toward the conveyor 11. A micro switch is actuated by one of the bar cams to stop the return travel of the conveyor 12 and at the same time start the conveyor 11 to run.

The other bar cam engages another micro switch to pre-set the conveyor motor 26 for feeding the next hand to the former 13.

The solenoid valve 155 which supplies the air blast to the manifold is actuated by the signal supplied by the sewing machine to the solenoid actuated pawl 160 inasmuch as the manifold is at the top of its stroke at this time.

It will be understood that a downward and upward movement of the manifold 33 is controlled by a signal received at the solenoid-actuated pawl 160 and a backward and forward movement of the grippers also are controlled thereby through the medium of the free wheeling one revolution clutch. Accordingly, if the sewing machine stops, the pick-up device and grippers are not actuated and no bags are discharged.

Figure 15:
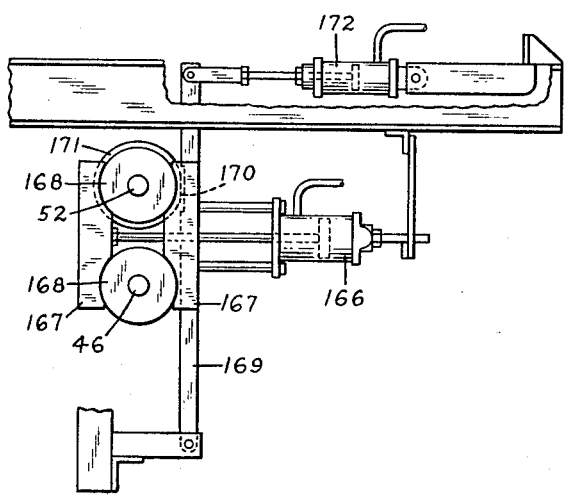
FIGURE 15 is a side elevational view of a modified form of clutch and brake for controlling the operation of the vacuum pick-up device and the gripping means of the apparatus.
Figure 12:
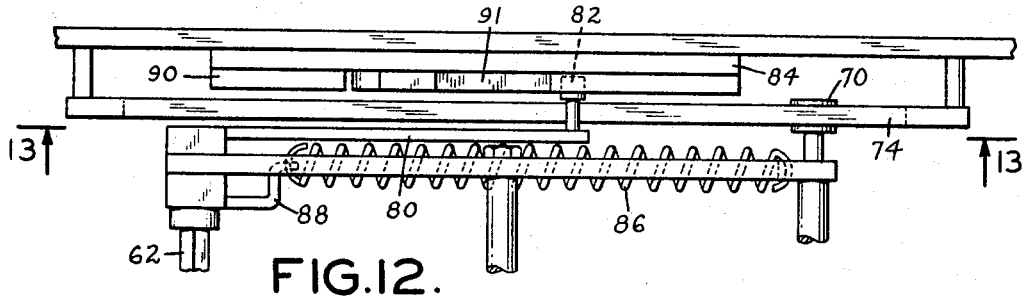
FIGURE 12 is a plan view of a portion of a cam for actuating the gripping mechanism of the apparatus.

It will be understood that modification and variation of the apparatus are possible within the scope of the invention for example, as shown in FIGURE 15, the single revolution clutch 53 may be provided with a braking system including a brake cylinder 166 which presses arcuate brake shoes 167 against drums 168 on the shafts 146 and 52 during about the last tenth or twelfth of the revolution. A stop lever 169 is pressed by air pressure at all times against a flat surface 170 on a drum 171 fixed to the shaft 53 to bring the shaft to a stop and retain the shaft 53 in position for another cycle. An air cylinder 172 is provided for pressing the lever 169 against the drum 171.

If desired, another row of suction cups may be mounted on the arms 38 and 39 to engage the trailing edges of the bags, the suction cups for engaging the trailing edge of the bag being suspended from an overhead manifold instead of from below to avoid interference with the backward movement of the bag by the gripping members.

Other arrangements are, of course, possible for actuating the gripping elements and the cam system disclosed herein and the operating controls may be modified as for example, by providing a sequencing switch for controlling the operation of the apparatus or a mechanical drive system may be used if desired. Accordingly, the form of the invention described herein should be considered illustrative and not as limiting the scope of the invention as defined in the following claims.

We claim:

1. An article feeding apparatus comprising means for supplying stacks of articles successively to a station, vacuum pick-up means movable in a first path toward and away from said station for engaging and displacing an article from said stack, gripping means for gripping and releasing an edge of said displaced article movable in a second path intersecting said first path; means for actuating said vacuum pick-up means and said gripping means in timed relation to engage said pick-up means with the uppermost article of said stack and displace it, actuate said gripping means to grip said article, move said gripping means in said second path in a direction to move said article out of said first path, move said pick-up means in said first path toward said station while said article is out of said first path, move said gripping means in the opposite direction in said second path and actuate said gripping means to release said article; and means for removing said article from said gripping means when said article is released.

2. The apparatus set forth in claim 1 in which said vacuum pick-up means comprises a manifold movably mounted adjacent to one end of said station, a plurality of spaced apart conduits extending upwardly from said manifold and suction cups on said conduits facing downwardly toward said station, said gripping means being interposed between said spaced apart conduits.

3. The apparatus set forth in claim 1 in which said station comprises a forming member having a curved surface portion for supporting said articles, and said vacuum pick-up means comprises a row of suction cups opposing said curved surface portion and disposed in a curve complemental to said curved surface portion to bend said articles into conformity with said surface portion and maintain them bent.

4. The apparatus set forth in claim 3 in which said forming member has a pair of convexly curved surface portions in side-by-side relation.

5. The apparatus set forth in claim 1 in which said vacuum pick-up means comprises a manifold, a plurality of conduits extending upwardly from said manifold, suction cups on said conduits facing toward said station, means connected to said manifold for maintaining a reduced pressure in said manifold and said suction cups and means responsive to movement of said pick-up means away from said station for introducing gas at superatmospheric pressure into said manifold and suction cups to release said article as it is gripped by said gripping means.

6. The apparatus set forth in claim 5 comprising a pair of pivoted lever arms supporting said manifold, crank means for oscillating said lever arms to move said pick-up means in said first path and a single revolution clutch for rotating said crank means through a single revolution in response to a signal.

7. The apparatus set forth in claim 5 comprising a first pair of pivoted lever arms supporting said manifold, first crank means for oscillating said lever arms to move said pick-up means in said first path, a second pair of pivoted lever arms supporting said gripping means, second crank means for oscillating said gripping means in said second path, and a single revolution clutch connected to said first and second cranks for rotating said cranks through a single revolution in response to a signal.

8. The apparatus set forth in claim 1 in which said gripping means comprises a pair of pivoted lever arms, a pair of spaced apart substantially parallel shafts extending between said lever arms, at least two elongated gripping members fixed to one of said shafts, at least two elongated gripping members fixed to the second shaft, said second shaft being mounted for rotation relative to said lever arms, crank means for oscillating said lever arms in said second path, and cam means for rocking said second shaft to move said gripping members on said second shaft toward and away from said gripping members on said first shaft to grip and release said article.

9. The apparatus set forth in claim 8 in which said means for removing said article comprises a pair of endless driven belts for engaging an article gripped by said gripping members and withdrawing said articles from said gripping members and moving it between said first and second shafts.

10. The apparatus set forth in claim 1 comprising means for lifting the trailing edge of the last-remaining article of a stack at said pick-up station to enable said means for supplying a stack of articles to supply said stack to said station beneath said last-remaining article.

11. The apparatus set forth in claim 10 in which said means for lifting the trailing edge of said last-remaining article comprises a plurality of pivoted arms, electromagnetic means for moving said arms to lift said last-remaining article and means responsive to movement of said pick-up means into engagement with said last-remaining article for actuating said electromagnetic means to move said arms to lift said trailing edge.

12. The apparatus set forth in claim 10 in which said means for lifting the trailing edge of said last remaining article comprises jets adjacent to said station for directing air against the lowermost article in a stack and means for supplying air to said jets at a pressure sufficient to lift said trailing edge of said last remaining article.

13. The apparatus set forth in claim 1 comprising means for maintaining the edges of said articles in said stack in alignment at said station.

14. The apparatus set forth in claim 13 in which said means for maintaining said edges in alignment comprises a pair of slidably and pivotably mounted packer members for engaging the trailing edges of said articles in a stack, and means responsive to movement of said gripping means in said second path for moving said packer members into and out of engagement with said trailing edges, said packer member being moved pivotally out of the path of a stack of articles by movement of the stack to said station.

15. The apparatus set forth in claim 13 in which said means for maintaining said edges in alignment comprises a pair of slidably and pivotably mounted packer members for engaging the trailing edges of said articles in a stack, means responsive to movement of said gripping means in said second path for moving said packer members into and out of engagement with said trailing edges, and fluid pressure actuated means for pivoting said packer members out of the path of a stack being supplied to said station while a stack of articles is being supplied to said station.

16. A method of feeding bags comprising moving a stack of a plurality of bags to a pick-up zone from which said bags are to be discharged in one direction, engaging at least the leading edge of the topmost bag of said stack and lifting said leading edge out of contact with the remaining bags in said stack, moving said topmost bag in a direction opposite to said one direction, engaging another bag of said stack while said topmost bag is moved in said opposite direction, moving said topmost bag in said one direction and carrying it away from above said stack and lifting said another bag.

17. The method set forth in claim 16 comprising lifting the last bag in a stack and moving another stack of bags beneath said last bag.

18. The method set forth in claim 16 comprising repeatedly impacting an edge of said bags in said stack in said one direction to maintain said bags in an aligned stack at said pick-up zone.

19. The method set forth in claim 16 in which said bags have gussets in their leading and trailing edges, and comprising bending said leading edges of said bags lengthwise during picking up and lifting to maintain the gusset in said leading edge closed.

20. An article feeding apparatus comprising a former for receiving a stack of flexible articles, said former having a curved surface, vacuum pick-up means including a plurality of suction cups movable toward and away from said former to engage and lift an article from said stack, said suction cups being disposed in a curve complemental to said curved surface to bend said articles into conformity with said surface and maintain them bent while lifting said article.

References Cited

UNITED STATES PATENTS

| | | | |
|---|---|---|---|
| 665,840 | 1/1901 | Salmon | 271—30 |
| 2,866,642 | 12/1958 | Halvorsen | 271—89 |
| 2,963,292 | 12/1960 | Buttner | 271—11 |
| 3,219,380 | 11/1965 | Carliss | 294—64 |

EDWARD A. SROKA, *Primary Examiner.*